(12) United States Patent
Li (10) Patent No.: US 11,990,930 B2
(45) Date of Patent: May 21, 2024

(54) FILM PASTING DEVICE FOR ELECTRONIC TERMINALS

(71) Applicant: XuYi Photoelectric Technology Co., LTD., Guangdong (CN)

(72) Inventor: Mingfeng Li, Hunan (CN)

(73) Assignee: XuYi Photoelectric Technology Co., LTD., Shenzhen (CN)

( * ) Notice: Subject to any disclaimer, the term of this patent is extended or adjusted under 35 U.S.C. 154(b) by 261 days.

(21) Appl. No.: 17/746,949

(22) Filed: May 17, 2022

(65) Prior Publication Data

US 2023/0344458 A1    Oct. 26, 2023

(30) Foreign Application Priority Data

Apr. 20, 2022  (CN) .......................... 202220925478.5

(51) Int. Cl.
| | |
|---|---|
| *B32B 41/00* | (2006.01) |
| *B29C 63/00* | (2006.01) |
| *B29C 63/02* | (2006.01) |
| *H04B 1/3888* | (2015.01) |
| *B29L 31/34* | (2006.01) |

(52) U.S. Cl.
CPC ....... *H04B 1/3888* (2013.01); *B29C 63/0004* (2013.01); *B29C 63/025* (2013.01); *B29C 2063/0008* (2013.01); *B29L 2031/3475* (2013.01)

(58) Field of Classification Search
CPC . H04B 1/3888; B29C 63/0004; B29C 63/025; B29C 2063/0008; B29L 2031/3475
USPC ................... 156/60, 64, 350, 351, 378, 379
See application file for complete search history.

(56) References Cited

U.S. PATENT DOCUMENTS

| | | | |
|---|---|---|---|
| 2013/0237296 A1* | 9/2013 | Chen | ................... B29C 63/0004 |
| | | | 455/575.8 |
| 2020/0324536 A1* | 10/2020 | Xiong | ..................... B29C 63/02 |
| 2021/0176351 A1* | 6/2021 | Bulkley | ................ G06F 1/1626 |

* cited by examiner

*Primary Examiner* — Michael N Orlando
*Assistant Examiner* — Joshel Rivera (57) ABSTRACT

Disclosed is a film pasting device for electronic terminals. The device includes: a fixing seat provided with a containing groove for containing an electronic terminal, the containing groove being provided with a first mounting seat and a second mounting seat respectively, and the first mounting seat and the second mounting seat being provided with magnetic positioning members; and an adhesive film provided with positioning parts. Mounting holes are provided at the fixing seat, and a protective film can be directly aligned with the electronic terminal during pasting; and the first mounting seat and the second mounting seat are arranged in a structure higher than the containing groove, so that the adhesive film can be prevented from being pasted to the electronic terminal when being placed, a defective rate of film pasting is reduced, film pasting is simple, production cost is low, and the device is convenient to use.

10 Claims, 7 Drawing Sheets

FILM PASTING DEVICE FOR ELECTRONIC TERMINALS

CROSS REFERENCE TO RELATED APPLICATIONS

The present application claims the benefit of Chinese Patent Application No. 202220925478.5 filed on Apr. 20, 2022, the contents of which are incorporated herein by reference in their entirety.

TECHNICAL FIELD

The present disclosure relates to the technical field of electronic terminal film pasting, and in particular to a film pasting device for electronic terminals.

BACKGROUND ART

At present, an electronic terminal has become one of the most important communication tools for people. During use of the electronic terminal, its screen is prone to scratches, which affect a display effect and an appearance of the electronic terminal screen. Therefore, most users may paste an adhesive film to the electronic terminal screen to protect the screen and avoid scratches in a use process. However, film pasting is mostly conducted manually during electronic terminal film pasting. Film pasting correction only depends on eyes to see whether the adhesive film is aligned or not and needs to be conducted with hands. It is difficult to accurately position an electronic terminal film and the electronic terminal screen. Moreover, film pasting efficiency is low and film pasting quality is poor, resulting in dust and fingerprints in the film. It takes a lot of time to slowly align the electronic terminal film with the electronic terminal screen during electronic terminal film pasting, which is troublesome to operate and wastes time.

Thus, it is urgent to design a film pasting device for electronic terminals to overcome defects of the prior art.

SUMMARY

To achieve the technical objective, the present disclosure uses the technical solution as follows: a film pasting device for electronic terminals includes:
- a fixing seat, where the fixing seat is provided with a containing groove for containing an electronic terminal, two ends of the containing groove are provided with a first mounting seat and a second mounting seat respectively, the first mounting seat and the second mounting seat are provided with magnetic positioning members, and after the electronic terminal is place in the containing groove, an upper surface of the electronic terminal is lower than upper surfaces of the first mounting seat and the second mounting seat; and
- an adhesive film, where each of two ends of the adhesive film is provided with a positioning part capable of being magnetically attracted to the magnetic positioning member, and after the positioning parts are magnetically attracted to the magnetic positioning members, the adhesive film corresponds to the upper surface of the electronic terminal.

In a preferred embodiment, the upper surface of the first mounting seat is higher than the upper surface of the second mounting seat.

In a preferred embodiment, the upper surface of the second mounting seat is flush with the upper surface of the electronic terminal placed in the containing groove.

In a preferred embodiment, the upper surface of the first mounting seat is flush with the upper surface of the second mounting seat.

In a preferred embodiment, the first mounting seat and the second mounting seat are provided with mounting holes, the magnetic positioning members are pre-embedded in the mounting holes, and upper surfaces of the magnetic positioning members are lower than the upper surfaces of the first mounting seat and the second mounting seat.

In a preferred embodiment, the positioning parts match the mounting holes in shape, and after extending into the mounting holes, the positioning parts are magnetically attracted to the magnetic positioning members in the mounting holes.

In a preferred embodiment, the mounting hole includes a longitudinal through hole; an upper flange that is arranged on an upper end face of the through hole, extends inwards and is configured to limit movement of the magnetic positioning member; a lower flange that is arranged on an inner wall of the through hole, located below the upper flange, extends inwards and is configured to limit movement of the magnetic positioning member; and through slots that are provided on the through hole and vertically provided so as to facilitate clamping of the magnetic positioning member.

In a preferred embodiment, a lower end face of the lower flange is provided with a bevel edge for facilitating clamping of the magnetic positioning member.

In a preferred embodiment, a side wall of the containing groove is provided with several limiting ribs vertically arranged.

In a preferred embodiment, a bottom of the containing groove is provided with a rectangular hole.

The present disclosure has the beneficial effects: in the present disclosure, the mounting holes are provided at two ends of the fixing seat, and the corresponding positioning parts are arranged on the adhesive film, so that a protective film may be directly aligned with the electronic terminal during pasting, correction operation of a user is reduced, and deviation during film pasting is avoided; and the first mounting seat and the second mounting seat are arranged in a structure higher than the containing groove, so that the adhesive film may be prevented from being pasted to the electronic terminal when being placed, a defective rate of film pasting is reduced, film pasting is simple, production cost is low, and the film is convenient to use.

10, fixing seat; 101, containing groove; 102, first mounting seat; 103, second mounting seat; 104, mounting hole; 105, first arc-shaped transition part; 106, second arc-shaped transition part; 107, limiting rib; 108, rectangular hole; 11, adhesive film; 111, grip part; 112, positioning part; 13, upper flange; 14, lower flange; 15, through slot; 16, through hole; 17, magnetic positioning member; 18, bevel edge; and 19, handle part.

DETAILED DESCRIPTION OF THE EMBODIMENTS

To enable the objectives, features, and advantages mentioned above of the present disclosure to be more apparent and easily understood, specific embodiments of the present disclosure will be described in detail below with reference to the drawings. Many specific details are set forth in the following description to facilitate full understanding of the present disclosure. However, the present disclosure may be implemented in many other modes different from those described herein, similar improvements may be made by those skilled in the art without departing from the connotation of the present disclosure, and therefore the present disclosure is not limited by the specific embodiments disclosed below.

As shown in FIGS. 1-5, the present disclosure provides a film pasting device for electronic terminals. The device includes: a fixing seat 10, where a middle portion of the fixing seat 10 is provided with a containing groove 101 for containing an electronic terminal, the fixing seat 10 includes a first mounting seat 102 and a second mounting seat 103, the first mounting seat 102 and the second mounting seat 103 are provided with magnetic positioning members 17, and in the embodiment, the first mounting seat 102 and the second mounting seat 103 are both higher than a top face of the containing groove 101; and an adhesive film 11, where the adhesive film 11 matches the containing groove 101 and is configured to contain and paste a protective film, two ends of the adhesive film 11 are provided with grip parts 111 in an extending manner, positioning parts 112 are arranged in the grip parts 111, and the positioning parts 112 are capable of matching the magnetic positioning members 17. Specifically, during use, a mobile photo or other electronic terminals is placed in the containing groove 101, the adhesive film 11 is placed on a surface of the fixing seat 10, and the positioning parts 112 are attracted by inserting the positioning parts 112 into the magnetic positioning members 17, thereby positioning the adhesive film 11. In this case, the first mounting seat 102 and the second mounting seat 103 are both higher than the containing groove 101, so the protective film on the adhesive film 11 cannot be pasted to the electronic terminal when the adhesive film 11 is placed, and the situation that the protective film is pasted to a screen of the electronic terminal when the adhesive film 11 is not in place, resulting in deviation of the protective film may be effectively avoided. When the adhesive film 11 is placed in place, an edge of the adhesive film 11 on the second mounting seat 103 is pressed, so that an end of the protective film on the adhesive film 11 is pasted to an edge of the electronic terminal at the end. Then the grip part 111 on the second mounting seat 103 is lifted, so that the positioning part 112 on the grip part is disengaged from the magnetic positioning member 17. The adhesive film 11 is lifted at a constant speed by means of the grip part 111. In this case, one end of the protective film is pasted to the electronic terminal, so when the adhesive film 11 is lifted, the protective film is separated from the adhesive film 11 and pasted to the electronic terminal.

Furthermore, in the embodiment, a height of the first mounting seat 102 is higher than that of the second mounting seat 103, a first arc-shaped transition part 105 is arranged between the first mounting seat 102 and the containing groove 101, and a second arc-shaped transition part 106 is arranged between the second mounting seat 103 and the containing groove 101. Specifically, for the adhesive film 11, to conveniently paste and separate the protective film, the adhesive film 11 is set to be flexible; and to conveniently place the adhesive film 11 and align the adhesive film 11, when the adhesive film 11 is placed, it is necessary to place one end before the other end of the adhesive film. However, when the adhesive film 11 is placed in this way, the adhesive film may be bent, resulting in that the protective film on the adhesive film 11 is easily pasted to the electronic terminal. To avoid the situation, in the embodiment, the height of the first mounting seat 102 is set to be higher than that of the second mounting seat 103, so that the adhesive film 11 is placed on the first mounting seat 102 first. In this case, since the first mounting seat 102 and the second mounting seat 103 are both higher than the containing groove 101, and the first mounting seat 102 is higher than the second mounting seat 103, so that a distance between an upper surface of the first mounting seat 102 and the containing groove 101 is large, when the adhesive film 11 is placed, even if the adhesive film 11 is bent, the adhesive film cannot be directly pasted to the electronic terminal, thereby facilitating subsequent placement and alignment of the second mounting seat 103. To avoid the situation that the protective film on the adhesive film 11 cannot be well pasted to the electronic terminal due to high heights of two ends when the protective film is pasted to the electronic terminal, the first arc-shaped transition part 105 is arranged between the first mounting seat 102 and the containing groove 101, and the second arc-shaped transition part 106 is arranged between the second mounting seat 103 and the containing groove 101, so that the adhesive film 11 may better make contact with and be pasted to a flat face of the electronic terminal.

Furthermore, optionally, the upper surface of the second mounting seat 103 is flush with the upper surface of the electronic terminal placed in the containing groove 101. Specifically, two ends of the adhesive film 11 are both provided with the positioning parts 112, and the positioning parts 112 match the magnetic positioning members 17 in a convex and concave manner, so that even if the upper surface of the second mounting seat 103 is flush with the containing groove 101, the adhesive film 11 cannot be pasted to the electronic terminal when the adhesive film is not in place due to convex design of the positioning parts 112.

Furthermore, optionally, the upper surface of the first mounting seat 102 is flush with the upper surface of the second mounting seat 103. Specifically, the two ends of the adhesive film 11 are both provided with the positioning parts 112, and the positioning parts 112 match the magnetic positioning members 17 in both a convex and concave manner and a magnetic attraction manner, so that even if the upper surface of the second mounting seat 103 and the upper surface of the first mounting seat 102 are flush with the containing groove 101, the adhesive film 11 cannot be pasted to the electronic terminal when the adhesive film is not in place due to convex design of the positioning parts 112.

Furthermore, in the embodiment, the first mounting seat 102 and the second mounting seat 103 are provided with mounting holes 104, the magnetic positioning members 17 are pre-embedded in the mounting holes 104, and upper surfaces of the magnetic positioning members 17 are lower than the upper surfaces of the first mounting seat 102 and the second mounting seat 103. The positioning parts 112 match the mounting holes 104 in shape, and after extending into the mounting holes 104, the positioning parts 112 are magnetically attracted to the magnetic positioning members 17 in the mounting holes 104. Specifically, since the positioning parts 112 are designed to be in convex structures, to avoid the situation that film pasting cannot be conducted well because a distance between the adhesive film 11 and the electronic terminal is too large due to limiting of the positioning parts 112, when the magnetic positioning members 17 are mounted in the mounting holes 104, the upper surfaces of the magnetic positioning members 17 are lower than the upper surfaces of the first mounting seat 102 and the second mounting seat 103, so that when the positioning parts 112 are magnetically attracted to the magnetic positioning members 17, convex parts of the positioning parts 112 sink into the mounting holes 104, and the distance between the adhesive film 11 and the electronic terminal is reduced.

Figure 3:
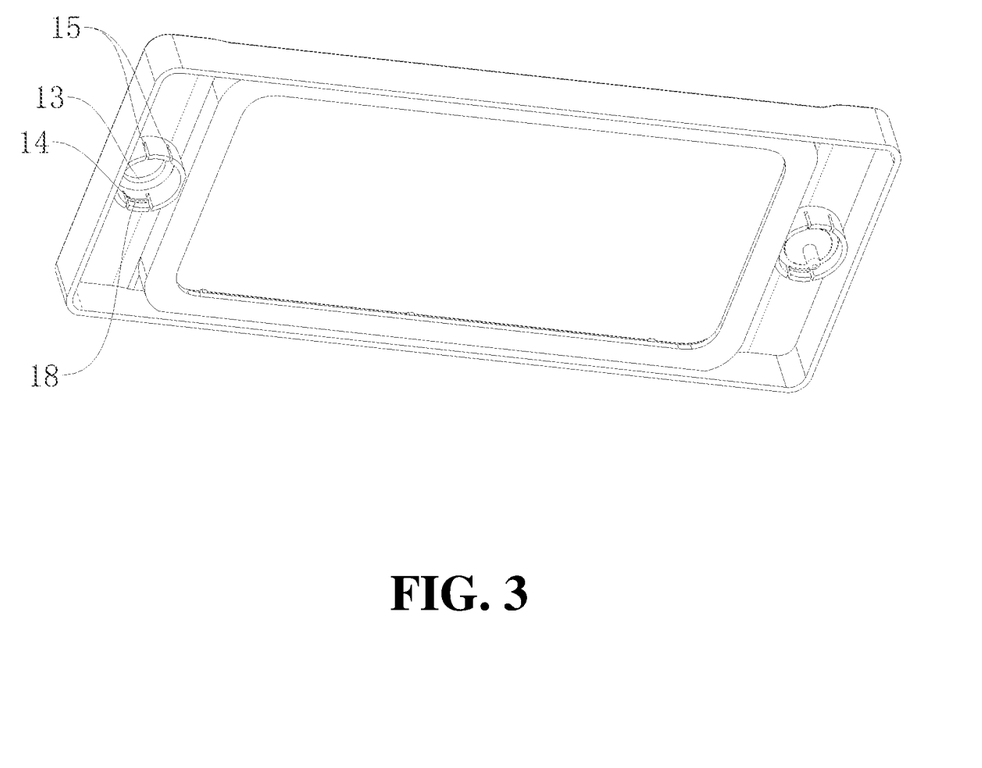
FIG. 3 is a structural schematic diagram of a mounting hole of the present disclosure.
Figure 4:
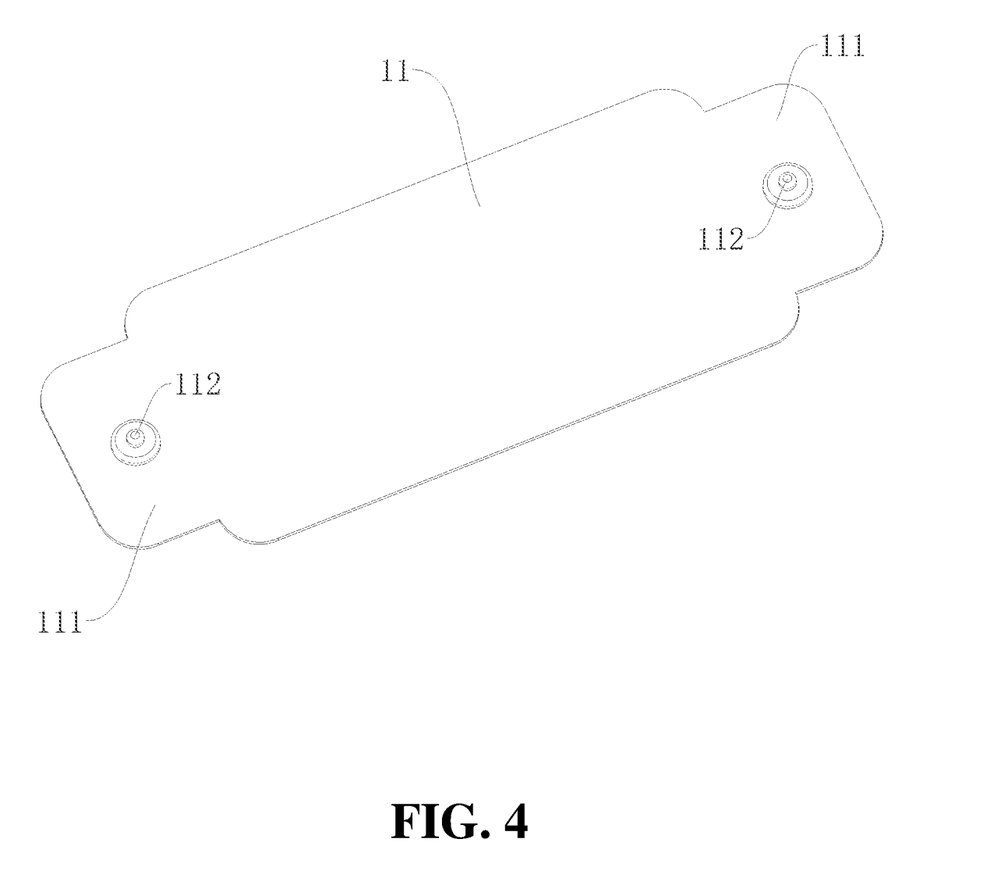
FIG. 4 is a structural schematic diagram of an adhesive film of the present disclosure.
Figure 5:
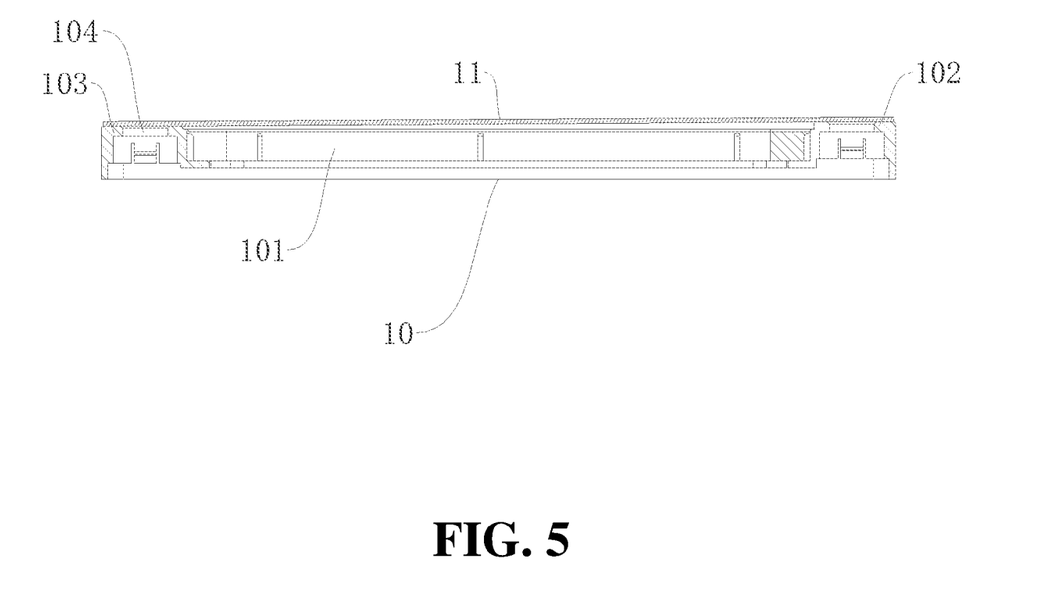
FIG. 5 is a sectional view of the present disclosure.

Furthermore, in the embodiment, the mounting hole 104 includes a longitudinal through hole 16; an upper flange 13 that is arranged on an upper end face of the through hole 16, extends inwards and is configured to limit movement of the magnetic positioning member 17; a lower flange 14 that is arranged on an inner wall of the through hole 16, located below the upper flange 13, extends inwards and is configured to limit movement of the magnetic positioning member 17; and through slots 15 that are provided on the through hole 16 and vertically provided so as to facilitate clamping of the magnetic positioning member 17. Specifically, the upper flange 13 is configured to limit upward movement of the magnetic positioning member 17, the lower flange 14 is configured to limit downward movement of the magnetic positioning member 17, there are four through slots 15, and through design of the through slots 15, side walls of two adjacent through slots 15 close to each other have certain elasticity, which may shrink when being pressed by outside, thereby facilitating clamping of the magnetic positioning member 17.

Furthermore, in the embodiment, a lower end face of the lower flange 14 is provided with a bevel edge 18 for facilitating clamping of the magnetic positioning member 17, which is a chamfer. Specifically, with the bevel edge 18 arranged, the magnetic positioning member 17 may push a side wall of the through hole 16 to move outward when being pressed into the mounting hole 104, so that the magnetic positioning member 17 may be pressed into the through hole 16 and fixed by the upper flange 13 and the lower flange 14.

Figure 1:
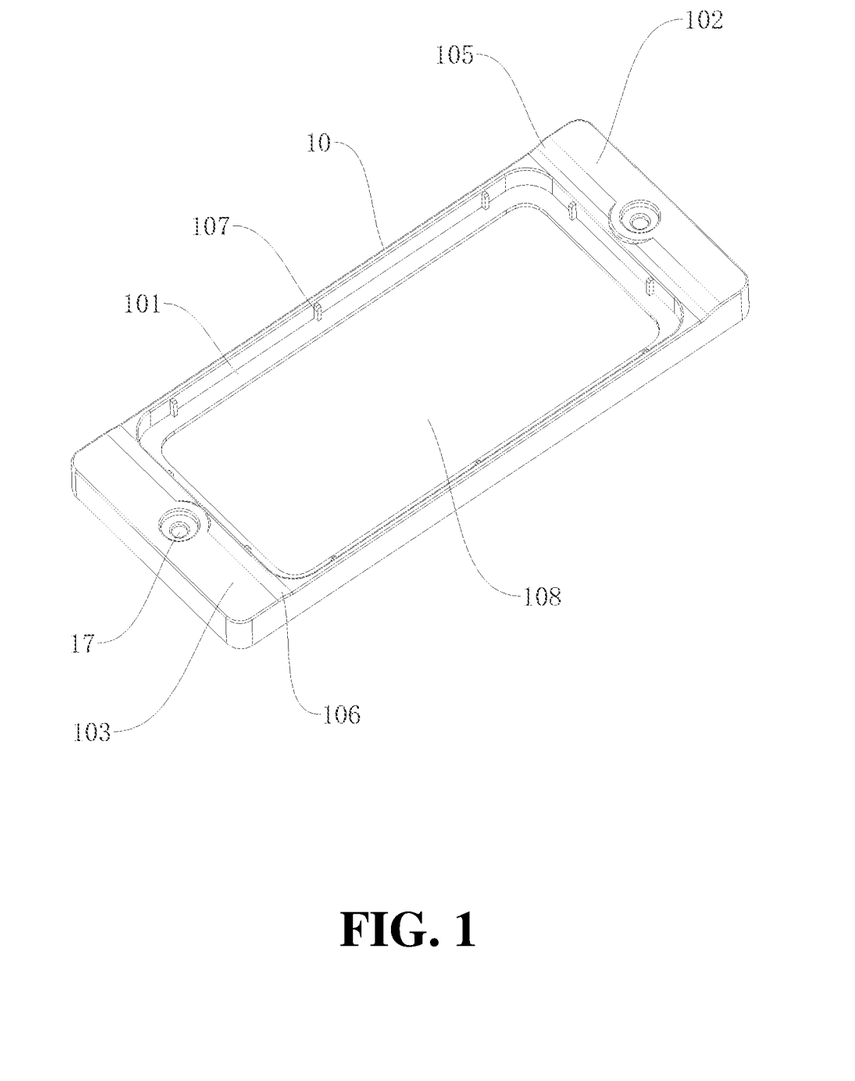
FIG. 1 is a structural schematic diagram of the present disclosure.
Figure 2:
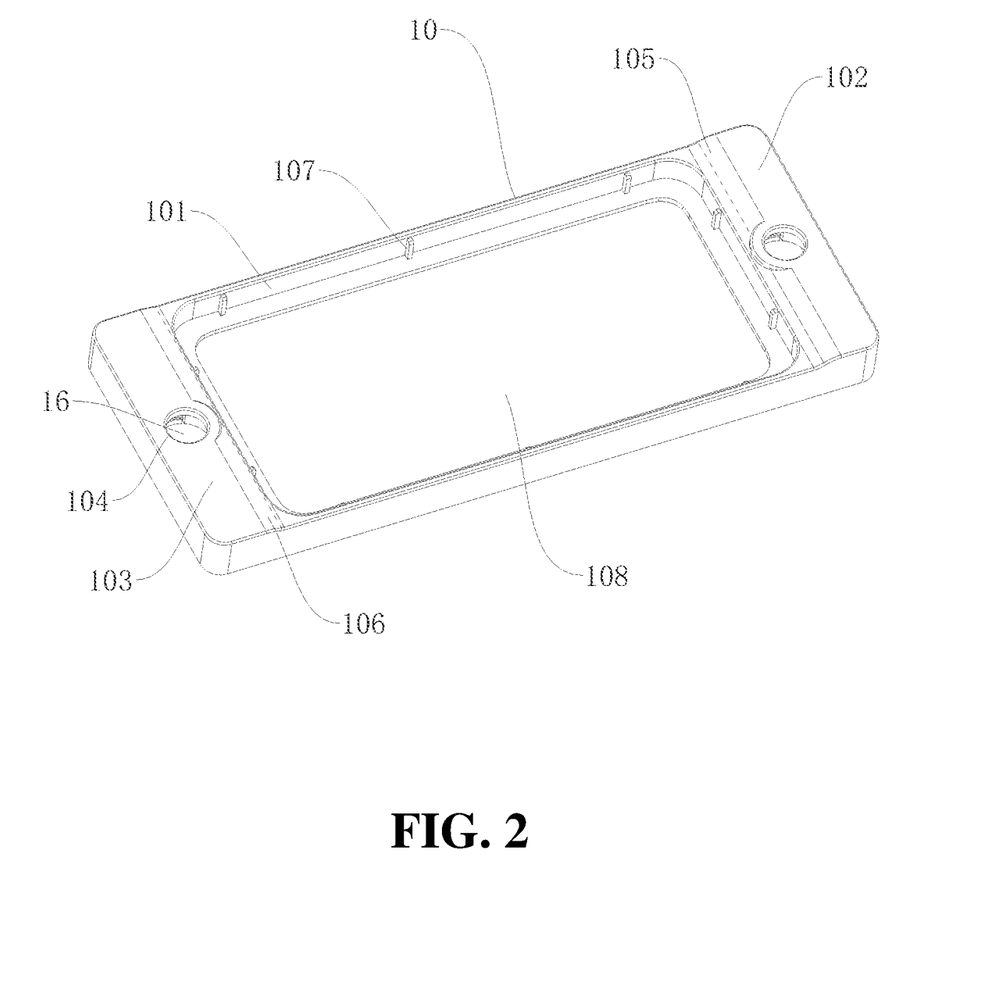
FIG. 2 is a structural schematic diagram II of the present disclosure.

Furthermore, in the embodiment, a side wall of the containing groove 101 is provided with several limiting ribs 107 vertically arranged. Specifically, the side wall of the containing groove 101 is provided with several limiting ribs 107 vertically arranged along the side wall of the containing groove 101, and the adjacent limiting ribs 107 are arranged at intervals, so that when being placed in the containing groove 101, the electronic terminal is stopped by the limiting ribs 107 and cannot move horizontally, thereby preventing the adhesive film 11 from being aligned with the screen of the electronic terminal.

Furthermore, in the embodiment, a bottom of the containing groove 101 is provided with a rectangular hole 108, the rectangular hole 108 and the containing groove 101 are concentrically arranged, and an area of the rectangular hole 108 is smaller than that of the containing groove 101. The rectangular hole 108 may reduce material requirements of the film pasting device, reduce a weight of the film pasting device, and make the device easier to carry. In addition, the rectangular hole 108 may prevent camera hardware and a back face of the electronic terminal from rubbing against the fixing seat 10 and then wearing. Moreover, the electronic terminal may be conveniently pushed out of the fixing seat 10 via the rectangular hole 108 after the film is pasted to the electronic terminal.

Figure 6:
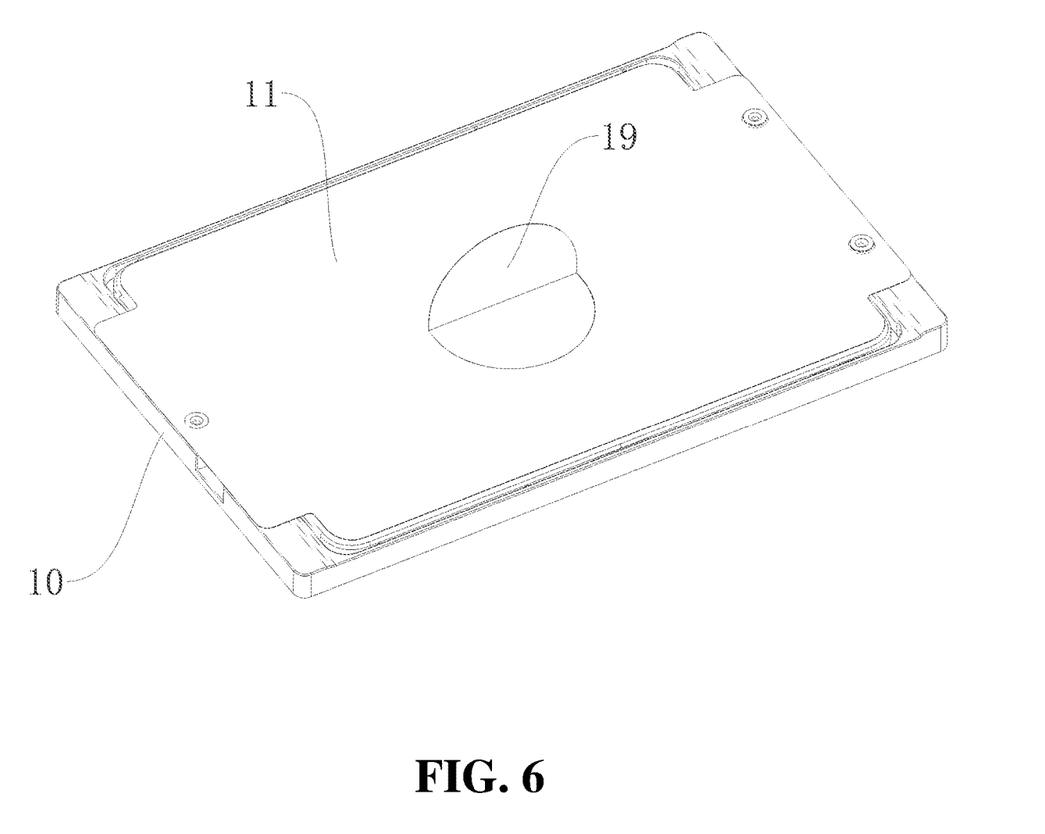
FIG. 6 is a structural schematic diagram of Embodiment 2 of the present disclosure.
Figure 7:
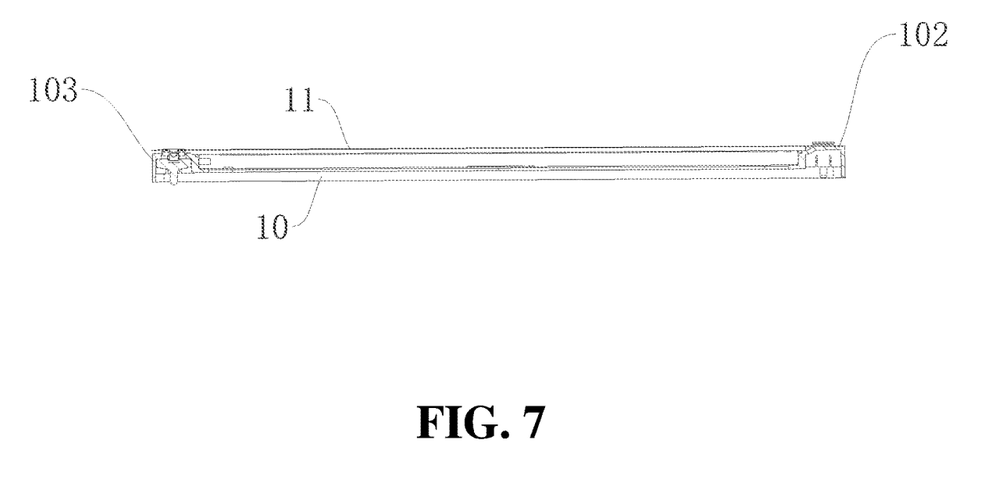
FIG. 7 is a sectional view of Embodiment 2 of the present disclosure.

In another embodiment of the present disclosure, as shown in FIGS. 6-7, a film pasting device used for tablet computers and iPad is provided. Compared with a structure of the present disclosure, in the film pasting device used for iPad, a first mounting seat 102 is provided with two mounting holes 104, and a second mounting seat 103 is provided with one mounting hole 104. Similarly, a grip part 111 corresponding to the first mounting seat 102 on an adhesive film 11 is provided with two positioning parts 112. The first mounting seat 102 is provided with the two mounting holes 104 and the corresponding positioning parts 112, so that a protective film on the adhesive film 11 cannot be pasted to a tablet computer when being not in place by means of the two positioning parts 112 even if a width of the protective film is large. In addition, a vertical handle part 19 is arranged in the middle of the adhesive film 11. Due to a large area of the tablet computer, an area of a matching adhesive film 11 may also be increased. To prevent a user from inconveniently picking up and placing the adhesive film on a fixing seat 10, the vertical handle part 19 is arranged in the middle of the adhesive film 11, so that during use, the adhesive film 11 may be lifted directly by the handle part 19 and placed on the fixing seat 10, thereby facilitating alignment of the adhesive film 11 and achieving operation with one hand. Moreover, the handle part 19 is foldable. Other structures and use methods are consistent with those of Embodiment 1.

In conclusion, in the present disclosure, the mounting holes 104 are provided at two ends of the fixing seat 10, and the corresponding positioning parts 112 are arranged on the adhesive film 11, so that the protective film may be directly aligned with the electronic terminal during pasting, correction operation of a user is reduced, and deviation during film pasting is avoided; and the first mounting seat 102 and the second mounting seat 103 are arranged in a structure higher than the containing groove 101, so that the adhesive film 11 may be prevented from being pasted to the electronic terminal when being placed, a defective rate of film pasting is reduced, film pasting is simple, production cost is low, and the device is convenient to use.

The present disclosure is not only limited to the descriptions in the description and the embodiments, so other advantages and modifications may be easily realized by those familiar with the art. Therefore, without departing from the spirit and scope of the general concept defined by the claims and the equivalent scope, the present disclosure is not limited to specific details, representative equipment and illustrated examples shown and described herein.

What is claimed is:
1. A film pasting device for electronic terminals, comprising:
a fixing seat, wherein the fixing seat is provided with a containing groove for containing an electronic terminal, two ends of the containing groove are provided with a first mounting seat and a second mounting seat respectively, the first mounting seat and the second mounting seat are provided with magnetic positioning members, and after the electronic terminal is place in the containing groove, an upper surface of the electronic terminal is lower than upper surfaces of the first mounting seat and the second mounting seat; and an adhesive film, wherein each of two ends of the adhesive film is provided with a positioning part capable of being magnetically attracted to the magnetic positioning members, and after the positioning parts are magnetically attracted to the magnetic positioning members, the adhesive film corresponds to the upper surface of the electronic terminal.

2. The film pasting device for electronic terminals according to claim 1, wherein the upper surface of the first mounting seat is higher than the upper surface of the second mounting seat.

3. The film pasting device for electronic terminals according to claim 2, wherein the upper surface of the second mounting seat is flush with the upper surface of the electronic terminal placed in the containing groove.

4. The film pasting device for electronic terminals according to claim 1, wherein the upper surface of the first mounting seat is flush with the upper surface of the second mounting seat.

5. The film pasting device for electronic terminals according to claim 1, wherein the first mounting seat and the second mounting seat are provided with mounting holes, the magnetic positioning members are pre-embedded in the mounting holes, and upper surfaces of the magnetic positioning members are lower than the upper surfaces of the first mounting seat and the second mounting seat.

6. The film pasting device for electronic terminals according to claim 5, wherein the positioning parts match the mounting holes in shape, and after extending into the mounting holes, the positioning parts are magnetically attracted to the magnetic positioning members in the mounting holes.

7. The film pasting device for electronic terminals according to claim 5, wherein the mounting hole comprises a longitudinal through hole; an upper flange that is arranged on an upper end face of the through hole, extends inwards and is configured to limit movement of the magnetic positioning member; a lower flange that is arranged on an inner wall of the through hole, located below the upper flange, extends inwards and is configured to limit movement of the magnetic positioning member; and through slots that are provided on the through hole and vertically provided so as to facilitate clamping of the magnetic positioning member.

8. The film pasting device for electronic terminals according to claim 7, wherein a lower end face of the lower flange is provided with a bevel edge for facilitating clamping of the magnetic positioning member.

9. The film pasting device for electronic terminals according to claim 1, wherein a side wall of the containing groove is provided with several limiting ribs vertically arranged.

10. The film pasting device for electronic terminals according to claim 1, wherein a bottom of the containing groove is provided with a rectangular hole.

\* \* \* \* \*